(12) United States Patent
Madishetti et al.

(10) Patent No.: US 11,622,164 B2
(45) Date of Patent: Apr. 4, 2023

(54) SYSTEM AND METHOD FOR STREAMING VIDEO/S

(71) Applicant: Carrier Corporation, Palm Beach Gardens, FL (US)

(72) Inventors: Pradeep Kumar Madishetti, Telangana (IN); Yevgeniy Shapiro, New York, NY (US); Richard W. Garmon, Mystic, CT (US); Suneel Kumar Nallamothu, Telangana (IN); Shaik Rafi, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/253,383

(22) PCT Filed: Jun. 30, 2020

(86) PCT No.: PCT/IB2020/056177
§ 371 (c)(1),
(2) Date: Dec. 17, 2020

(87) PCT Pub. No.: WO2021/009597
PCT Pub. Date: Jan. 21, 2021

(65) Prior Publication Data
US 2022/0191601 A1 Jun. 16, 2022

(30) Foreign Application Priority Data
Jul. 12, 2019 (IN) .............................. 201911028097

(51) Int. Cl.
*H04N 21/858* (2011.01)
*H04N 21/262* (2011.01)
(Continued)

(52) U.S. Cl.
CPC ... *H04N 21/8586* (2013.01); *H04N 21/26258* (2013.01); *H04N 21/6125* (2013.01); *H04N 21/8456* (2013.01)

(58) Field of Classification Search
CPC ......... H04N 21/8586; H04N 21/26258; H04N 21/6125; H04N 21/8456
(Continued)

(56) References Cited

U.S. PATENT DOCUMENTS 8,280,863 B2 10/2012 Pantos et al.
8,954,596 B2 * 2/2015 Ronca ..................... H04L 65/60
709/233
(Continued)

FOREIGN PATENT DOCUMENTS

CN 102572555 B 6/2014
CN 104506493 A 4/2015
(Continued)

OTHER PUBLICATIONS

"Control Apple HLS Client Caching with Wowza Streaming Engine"; Retrieved from Internet; URL: https://www.wowza.com/docs/how-to-control-apple-his-client-caching-ext-x-allow-cache; 2013; 4 pages.
(Continued)

*Primary Examiner* — Melvin H Pollack
(74) *Attorney, Agent, or Firm* — Cantor Colburn LLP

(57) ABSTRACT

Aspects of the invention are directed towards a system and a method for streaming video. One or more embodiments of the invention describe a method comprising steps of transmitting a request to a server by a user device for streaming a video and receiving one or more video segments of the video from the server. One or more embodiments of the invention further describe creating object uniform resource locators (URLs) for each of the one or more video segments and transmitting the created object URLs to the server,
(Continued)

wherein an in-memory playlist is created on the server including the object URLs of the one or more video segments. The user device receives the playlist URL of the in-memory playlist from the server and streams the one or more video segments of the video at the user device by using the playlist URL.

19 Claims, 5 Drawing Sheets

(51) Int. Cl.
*H04N 21/61* (2011.01)
*H04N 21/845* (2011.01)

(58) Field of Classification Search
USPC .................................................. 709/203, 231
See application file for complete search history.

(56) References Cited

U.S. PATENT DOCUMENTS

| | | | |
|---|---|---|---|
| 9,015,470 B2 * | 4/2015 | Losev | H04L 65/765 |
| | | | 713/153 |
| 9,521,179 B2 | 1/2016 | Chakarapani et al. | |
| 9,419,973 B2 | 8/2016 | Oyman | |
| 9,549,000 B2 | 1/2017 | Panje et al. | |
| 9,584,577 B2 | 2/2017 | Caulfield et al. | |
| 9,584,847 B2 * | 2/2017 | Ma | H04N 21/26258 |
| 9,628,531 B2 | 4/2017 | Giladi | |
| 9,692,800 B2 | 6/2017 | Gaunt et al. | |
| 9,813,746 B2 * | 11/2017 | Sheffler | H04L 67/561 |
| 9,825,801 B1 * | 11/2017 | Bakken | G06F 16/61 |
| 9,848,228 B1 * | 12/2017 | Morris | H04N 5/76 |
| 9,854,017 B2 * | 12/2017 | Gogoi | H04N 21/6547 |
| 9,860,604 B2 * | 1/2018 | Kocks | H04N 21/845 |
| 9,942,343 B2 * | 4/2018 | Zane | H04L 65/60 |
| 9,979,926 B1 * | 5/2018 | Asarikuniyil | H04N 5/93 |
| 10,063,610 B1 * | 8/2018 | Six | H04L 67/02 |
| 10,069,884 B2 | 9/2018 | Gaunt et al. | |
| 10,114,689 B1 * | 10/2018 | Yang | G06F 11/0751 |
| 10,116,713 B2 * | 10/2018 | Chen | H04L 47/724 |
| 10,116,763 B2 | 10/2018 | Houdaille et al. | |
| 10,122,539 B2 | 11/2018 | Larumbe et al. | |
| 10,148,714 B2 | 12/2018 | Wang | |
| 10,165,025 B2 * | 12/2018 | Agrawal | H04L 65/612 |
| 10,171,873 B2 | 1/2019 | Krebs | |
| 10,271,079 B1 * | 4/2019 | Woschank | H04N 21/4788 |
| 10,284,612 B2 * | 5/2019 | Zhang | H04L 65/80 |
| 10,397,618 B2 * | 8/2019 | Ugur | H04N 21/47202 |
| 10,397,636 B1 * | 8/2019 | Kalva | H04N 21/43076 |
| 10,630,746 B1 * | 4/2020 | Shen | H04L 65/70 |
| 10,708,391 B1 * | 7/2020 | Manj | H04L 65/4015 |
| 10,728,601 B2 * | 7/2020 | Asarikuniyil | H04N 21/2187 |
| 10,750,248 B1 * | 8/2020 | Haritaoglu | H04N 21/8456 |
| 10,785,508 B2 * | 9/2020 | Haritaoglu | H04N 21/26258 |
| 10,798,144 B2 * | 10/2020 | Nair | H04N 21/2223 |
| 10,798,464 B1 * | 10/2020 | Joseph | H04N 21/6125 |
| RE48,360 E * | 12/2020 | Kwon | H04N 21/6581 |
| 10,911,809 B2 * | 2/2021 | Fujimori | H04N 21/234327 |
| 10,939,152 B1 * | 3/2021 | Jindal | H04N 21/8456 |
| 10,986,387 B1 * | 4/2021 | Parulkar | H04N 21/23439 |
| 10,999,343 B1 * | 5/2021 | Six | H04L 43/106 |
| 11,095,743 B2 * | 8/2021 | Yellin | H04L 67/10 |
| 11,140,442 B1 * | 10/2021 | Wu | H04N 21/6582 |
| 11,159,635 B2 * | 10/2021 | Huang | H04L 65/65 |
| 2002/0069218 A1 * | 6/2002 | Sull | G11B 27/105 |
| | | | 715/201 |
| 2011/0246616 A1 | 10/2011 | Ronca et al. | |
| 2013/0074120 A1 * | 3/2013 | Adimatyam | H04N 21/25841 |
| | | | 725/33 |
| 2013/0097309 A1 * | 4/2013 | Ma | H04L 67/02 |
| | | | 709/224 |
| 2013/0198335 A1 | 8/2013 | Goel et al. | |
| 2014/0229976 A1 * | 8/2014 | Ma | H04N 21/2187 |
| | | | 725/87 |
| 2015/0249845 A1 | 9/2015 | Tirosh et al. | |
| 2015/0358418 A1 | 12/2015 | Gouache et al. | |
| 2015/0365450 A1 * | 12/2015 | Gaunt | H04L 65/65 |
| | | | 709/231 |
| 2016/0164996 A1 | 6/2016 | Gouache et al. | |
| 2016/0330289 A1 | 11/2016 | Gouache et al. | |
| 2016/0373821 A1 | 12/2016 | Nair et al. | |
| 2017/0126765 A1 | 5/2017 | Taibi et al. | |
| 2017/0171341 A1 | 6/2017 | Zane et al. | |
| 2017/0188054 A1 | 6/2017 | Ma et al. | |
| 2017/0302753 A1 | 10/2017 | Larumbe et al. | |
| 2017/0366593 A1 | 12/2017 | Lau | |
| 2018/0007443 A1 * | 1/2018 | Cannistraro | H04N 21/42224 |
| 2018/0020243 A1 * | 1/2018 | Ni | H04N 21/2187 |
| 2018/0027039 A1 * | 1/2018 | Moorthy | H04L 1/0002 |
| | | | 709/219 |
| 2018/0041561 A1 * | 2/2018 | Davies | H04L 65/762 |
| 2018/0137208 A1 * | 5/2018 | Ricker | H04N 21/8586 |
| 2018/0176613 A1 | 6/2018 | Gouache et al. | |
| 2018/0205742 A1 * | 7/2018 | Vinukonda | H04L 63/107 |
| 2018/0278990 A1 * | 9/2018 | Rutland | H04N 21/8456 |
| 2018/0310075 A1 * | 10/2018 | Casal Martin | H04L 65/80 |
| 2019/0037252 A1 | 1/2019 | Wagenaar et al. | |
| 2019/0069036 A1 * | 2/2019 | Afshar | H04N 21/65 |
| 2019/0132409 A1 * | 5/2019 | Hwang | H04L 67/306 |
| 2019/0312797 A1 * | 10/2019 | Sen | H04L 65/4084 |
| 2019/0327510 A1 * | 10/2019 | Kalagi | H04N 21/8543 |
| 2019/0364330 A1 * | 11/2019 | Moroney | H04N 21/26613 |
| 2020/0077161 A1 * | 3/2020 | Lohmar | H04L 65/602 |
| 2020/0128293 A1 * | 4/2020 | Mittal | H04N 21/234327 |
| 2020/0137464 A1 * | 4/2020 | Lewis | H04N 21/8545 |
| 2020/0154155 A1 * | 5/2020 | Sanghavi | H04N 21/23109 |
| 2020/0204603 A1 * | 6/2020 | Upadhyaya | H04L 65/4076 |
| 2020/0213640 A1 * | 7/2020 | Watson | H04N 21/26283 |
| 2020/0267434 A1 * | 8/2020 | Sanghavi | H04N 21/234345 |
| 2020/0304849 A1 * | 9/2020 | Hassler | H04N 21/23406 |
| 2020/0322411 A1 * | 10/2020 | Sanghavi | H04N 21/2408 |
| 2020/0322698 A1 * | 10/2020 | Sanghavi | H04N 21/8545 |
| 2020/0344307 A1 * | 10/2020 | Livshits | H04L 67/02 |
| 2020/0374577 A1 * | 11/2020 | Yin | H04N 21/23406 |
| 2020/0404361 A1 * | 12/2020 | Lohmar | H04N 21/6373 |
| 2021/0385514 A1 * | 12/2021 | Da Silva Pratas Gabriel | |
| | | | H04N 21/816 |

FOREIGN PATENT DOCUMENTS

| | | |
|---|---|---|
| CN | 105577645 A | 5/2016 |
| CN | 103581764 B | 1/2017 |
| CN | 106790005 A | 5/2017 |
| CN | 106792271 A | 5/2017 |
| CN | 108271085 A | 7/2018 |
| KR | 20160036924 A | 4/2016 |
| WO | 2016200998 A1 | 12/2016 |
| WO | 2017107378 A1 | 6/2017 |
| WO | 2019056929 A1 | 3/2019 |

OTHER PUBLICATIONS

"Introducing LHLS Media Streaming Go to the Profile of Periscope Code"; Pariscope Code to Follow Jul. 21, 2017; Retrieved from Internet; URL: https://medium.com/@periscopecode/introducing_lhls_media_streaming_3b21294bef; 5 pages.

"Understanding the HTTP Live Streaming Architecture; Understand how the major components of HLS work together to deliver streaming media"; Retrieved from Internet; URL: https://developer.apple.com/documentation/http_live_streaming/understanding_the_http_live_streaming_architecture; 2010; 2 pages.

Kylili; "Improving the Video Streaming Backend With On-the-Fly Format Conversion and Cloud Storage"; Delft University of Technology, The Netherlands; 2018; 65 pgs.

PCT International Search Report; International Application No. PCT/IB2020/056177; International Filing Date: Jun. 30, 2020; dated Sep. 10, 2020; pp. 1-3.

(56) References Cited

OTHER PUBLICATIONS

PCT ISR Written Opinion; International Application No. PCT/IB2020/056177; International Filing Date: Jun. 30, 2020; dated Sep. 10, 2020; pp. 1-6.

* cited by examiner

SYSTEM AND METHOD FOR STREAMING VIDEO/S

CROSS REFERENCE TO RELATED APPLICATIONS

This application is a National Stage application of PCT/IB2020/056177, filed Jun. 30, 2020, which claims the benefit of IN Application No. 201911028097, filed Jul. 12, 2019, both of which are incorporated by reference in their entirety herein.

TECHNICAL FIELD OF INVENTION

The present invention relates generally to multimedia. More particularly, the invention relates to a system and a method for streaming multimedia content.

BACKGROUND OF THE INVENTION

Currently, videos are being recorded by content providers and stored on a server. These pre-recorded videos are provided to users from the server based on a request from the users. Along with the pre-recorded videos, the content providers can also provide live streaming of videos to the users through the server. Further, such pre-recoded videos or the live videos can be transmitted from the server to a user device where these videos can be rendered/displayed in a browser of the user device.

At present, these videos can be displayed/rendered in the browser through media source extension (MSE) buffer technique, WebRTC protocol, HTTP Live Streaming (HLS) playlist file URL technique, or remote URL for a single video file technique. However, the media source extension (MSE) buffer technique, the WebRTC protocol and the HTTP Live Streaming (HLS) playlist file URL technique are designed only for specific types of browser/s and thus, cannot be implemented on all of the available browsers available in the market. Further, the remote URL used by the web browsers for retrieving the video content from the server does not support streaming of live video in real time.

FIG. 1 depicts an existing HTTP Live Streaming (HLS) architecture 100 for live video streaming comprising a media source 102, server 104, a distribution unit 106 connected to a network 108, and a user device 110. The media source 102 can be a content provider which provides pre-recorded videos and/or live videos to the server 104. The server 104 receives the pre-recorded and/or live videos from the media source 102 and stores these videos in a server disk. Further, these videos are encoded by a media encoding unit 104A of the server 104 using encoding algorithms. Further, the server 104 has a segmentation and validation unit 104B that divides the encoded videos into multiple video segments. The encoded multiple segments 106B of videos are then transmitted to a distribution unit 106, where a playlist file 106A is created at the server disk, which includes information of the encoded multiple segments 106B. The distribution unit 106 transmits the playlist file 106A and the encoded multiple segments 106B to the user device 110 over the network 108. Then, the user device 110 receives the playlist file 106A and the encoded multiple segments 106B over the network 108 and plays these encoded multiple segments 106B in accordance with the information provided in the playlist file 106A.

The existing architecture 100 requires the creation and storage of physical video segments 106B as well as physical playlist at the server disk. Also, existing architecture 100 requires transmission of the physical video segments 106B and transmission of the physical playlist file 106A to the user device 110. Further, the existing architecture 100 also requires the physical segmentation of the video at the server disk. The creation, storage and segmentation of the physical video at the server disk occupies a lot of space at the server disk. As a result, the server disk becomes unavailable. In order to make the space available at the server disk, the physical video segments 106B and the physical playlist file 106A are deleted/removed from the server disk after the video is played at the user device 110. Also, the creation/segmentation as well as the deletion/removal of the physical video segments 106B and the physical playlist file 106A happen periodically and such multiple operations on the server disk consumes a lot of time and therefore, also leads to disk fragmentation on the server 104.

In view of afore-mentioned problems in the existing architecture 100 for video streaming, there is a need of effective systems and methods for streaming video without creating or storing video segments as well as playlist at the server disk. There is also a need of systems and methods for streaming video that eliminates the problem of disk fragmentation on the server 104. In order to solve the problems in the existing solutions, systems and methods are disclosed for video streaming that addresses the afore-mentioned problems by avoiding usage of the server disk.

SUMMARY OF THE INVENTION

Various embodiments of the invention describe a method and a system for streaming a video. The invention discloses a method for streaming a video comprising the steps of transmitting a request to a server by a user device for streaming the video and receiving, from the server, one or more video segments of the video, the one or more video segments are stored in memory of the user device. The method further discloses the steps of creating object uniform resource locators (URLs) for each of the one or more video segments and transmitting the created object URLs to the server. Further, the server creates an in-memory playlist including the object URLs of the one or more video segments. Then, the user device receives a playlist URL of the in-memory playlist of the playlist from the server and using the playlist URL, the one or more video segments of the video are streamed to the user device.

In an embodiment of the invention, the server is coupled to a distribution unit for creating the playlist and the playlist URL.

In another embodiment of the invention, the object URLs for the one or more video segments in the playlist point to the memory of the user device for streaming the one or more video segments.

In a different embodiment of the invention, the memory on the user device for storing the one or more video segments is a memory space allocated to a web browser application.

In yet another embodiment of the invention, the one or more video segments are streamed in the web browser application and each of the one or more video segments has a specified duration.

In an alternative embodiment of the invention, the video is fetched from a content provider based on the request from the user device.

In a further embodiment of the invention, the video is a HyperText Transfer Protocol (HTTP)-based live streaming (HLS) video.

In another embodiment of the invention, the in-memory playlist is updated by the device based on new video segments received by the user device.

In other embodiment of the invention, the in-memory playlist includes one or more bit rates at which the each video segment is played at the user device and/or the in-memory playlist includes a sequence in which the each video segments to be played at the user device.

In yet another embodiment of the invention, a user device is disclosed for streaming a video. The user device comprises a communication unit configured to transmit a request to a server for streaming the video and receive one or more video segments of the video from the server, the one or more video segments are stored in memory of the user device. The user device further comprises an object uniform resource locators (URLs) generation unit configured to create object URLs for each of the one or more video segments. The communication unit is also configured to transmit the created object URLs to the server, wherein an in-memory playlist is created on the server including the object URLs of the one or more video segments and receive a playlist URL of the in-memory playlist from the server. Furthermore, the user device comprises a streaming unit configured to stream the one or more video segments of the video by using the playlist URL.

In another embodiment of the invention, the object URLs for the one or more video segments in the playlist point to the memory of the user device for streaming the one or more video segments.

In a different embodiment of the invention, the memory on the user device for storing the one or more video segments is a memory space allocated to a web browser application.

In yet another embodiment of the invention, the one or more video segments are streamed in the web browser application and each of the one or more video segments has a specified duration.

In another embodiment of the invention, the in-memory playlist is updated by the device based on new video segments received by the user device.

In other embodiment of the invention, the in-memory playlist includes one or more bit rates at which the each video segment is played at the user device and/or the in-memory playlist a sequence in which the each video segment to be played at the user device.

In various other embodiments of the invention, a server is disclosed for providing video to a user device. The server comprises a communication module configured to receive a request from the user device for streaming the video, creating one or more video segments of the video in a memory of the server and transmit the one or more video segments of the video to the user device. The communication module is also configured to receive, from the user device, object uniform resource locators (URLs) for each of the one or more video segments of the video. Further, the server comprises a URL generation unit configured to create a playlist URL for an in-memory playlist created by the server, the in-memory playlist including the object URLs of the one or more video segments. The communication module is further configured to transmit the playlist URL to the user device. The server also comprises a streaming unit configured to provide the video to the user device in an event the playlist URL is executed by the user device.

In an embodiment of the invention, the server is coupled with a distribution unit for creating the playlist and the playlist URL.

In another embodiment of the invention, the one or more video segments are in-memory video segments stored by the user device.

In a different embodiment of the invention, the object URLs for the one or more video segments in the playlist point to the memory of the user device for streaming the one or more video segments.

In various other embodiments of the invention, a computer readable medium is disclosed comprising one or more processors and a memory coupled to the one or more processors. The memory stores instructions which are executed by the one or more processors to transmit a request to a server by a user device for streaming a video and to receive one or more video segments of the video from the server, the one or more video segments are stored in memory of the user device. Further, object uniform resource locators (URLs) for each of the one or more video segments is created and transmitted to the server. The server creates an in-memory playlist including the object URLs of the one or more video segments. The user device receives a playlist URL of the in-memory playlist from the server and streams the one or more video segments of the video at the user device by using the playlist URL.

This summary is provided to introduce a selection of concepts in a simplified form from those that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is the technology for systems and methods for streaming videos by a user device from a server.

As used herein, the videos include any recorded videos and/or a HyperText Transfer Protocol (HTTP)-based live streaming (HLS) videos or any such videos well known in the art and provided by a content provider. Such videos are accessible by a user using a user device. The user device can use any user application or web browser or the like to stream the video on the user device.

As used herein, the user device may be a desktop computer or a hand held device such as a mobile phone with network connectivity. Example of the user equipment includes a desktop, workstation PC, a laptop, a smart phone, a tablet, a wearable device and the like.

As used herein, the server is a remote storage or a cloud storage where the content provider hosts the pre-recorded videos and/or live videos and such storage is accessible by the user of the user device, for example, based on user credentials.

Figure 1:
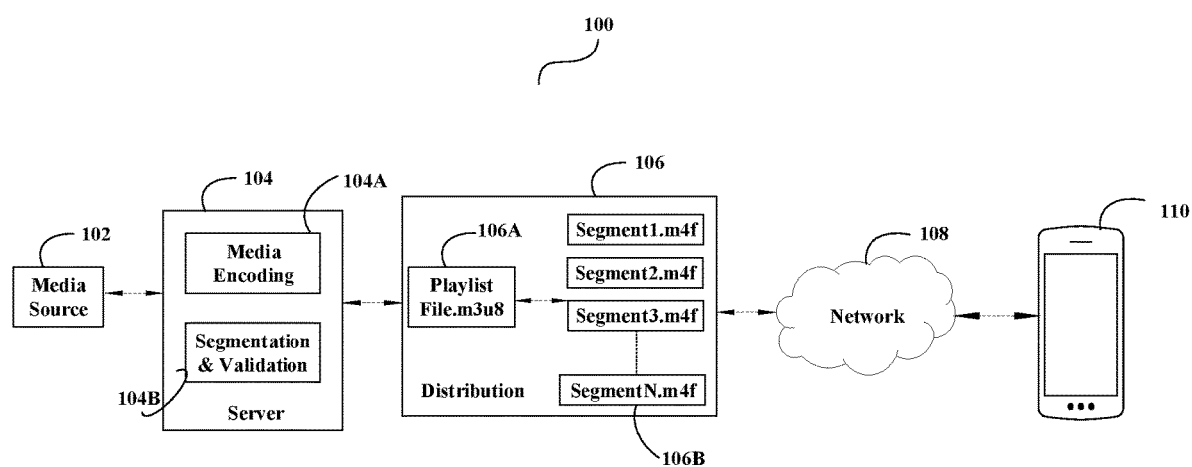
FIG. 1 depicts an existing architecture 100 of video streaming according to prior art systems.
Figure 2:
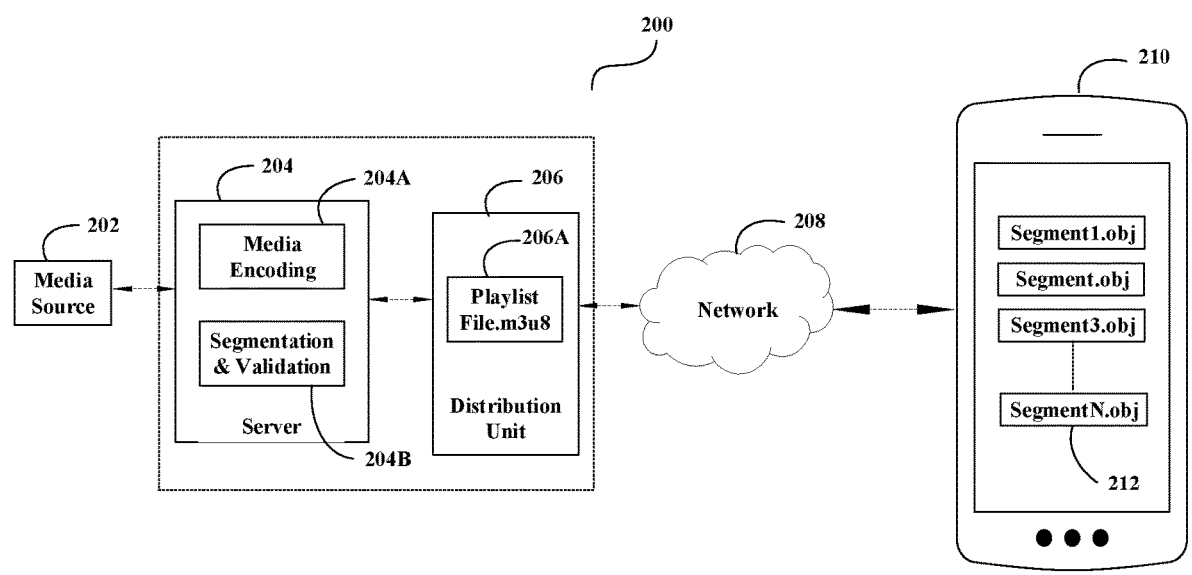
FIG. 2 depicts an exemplary architecture 200 of video streaming according to an exemplary embodiment of the invention.

FIG. 2 depicts an exemplary architecture 200 of video streaming, according to an exemplary embodiment of the invention. The exemplary architecture 200 comprises a media source 202, a server 204 coupled with a distribution unit 206 and a user device 210 connected to a network 208. The media source 202 can be a content provider, which provides pre-recorded videos and/or HyperText Transfer Protocol (HTTP)-based live streaming (HLS) videos to the server 204. The server 204 receives and stores the pre-recorded and/or HyperText Transfer Protocol (HTTP)-based live streaming (HLS) videos (provided by the media source 202) in a memory of the server 204. In addition, the pre-recorded and/or HyperText Transfer Protocol (HTTP)-based live streaming (HLS) video can be fetched from the media source 202 based on a request from the user device 210 through the server 204.

When the user device 210 transmits a request to the server 204 for streaming a video, a media encoding unit 204A of the server 104 encodes the requested video by using encoding algorithms. Further, the server 204 has a segmentation and validation unit 204B that divides the encoded video into multiple video segments for each encoded video. The multiple video segments for each video can be stored in the memory of the server 204 and not at the server disk and therefore, may be called as in-memory video segments. It is be noted here that the pre-recorded and/or HyperText Transfer Protocol (HTTP)-based live streaming (HLS) video are stored in the memory of the server 204 and not stored on a disk of the server 204.

The encoded multiple segments of video are then transmitted to a distribution unit 206 which is coupled to the server 204. The distribution unit 206 then transmits the encoded multiple segments of for each video to the user device 210 through the network 208. Each of the video segment has a specified duration. On receiving the encoded multiple segments of the video, the user device 210 may store and assemble the encoded multiple segments of the video in a memory of the user device 210 and therefore, these encoded multiple segments of video may be called as in-memory video segments at the user device 210. The memory of the user device 210 may be a memory allocated to a web application process, wherein such process may be implemented in a web browser application of the user device 210. In a specific embodiment, the memory on the user device 210 for storing the one or more video segments is a memory space allocated to a web browser application.

After storing the encoded multiple segments of video in the memory of the user device 210, the user device 210 may create object uniform resource locators (URLs) 212 for each of the in-memory video segments. For example, each of the object URL at the user device 210 may have an extension such as ".obj". In an embodiment, the object URLs for each of the in-memory video segments at the user device 210 may be Javascript object URLs. As used herein, the object URLs may be used by the user device 210 to refer/point and access the in-memory video segments at the user device 210 by using address of the memory of the user device 210 using the object URL where the in-memory video segments are stored.

Once the user device 210 creates the object URLs 212 for each of the in-memory video segments, the user device 210 transmits the created object URLs 212 to the distribution unit 206. The distribution unit 206 then receives the created object URLs 212 of the in-memory video segments and creates a in-memory playlist 206A including each of the object URLs 212 of the in-memory video segments in the in-memory playlist 206A. Further, the in-memory playlist 206A may be stored in the memory of the server 204 and not at the server disk and therefore, called as in-memory playlist. Subsequently, the distribution unit 206 creates a URL for the playlist 206A having the object URLs 212 of the in-memory video segments present at the user device 210. Then, the distribution unit 206 transmits the URL of the playlist 206A to the user device 210. Further, the playlist 206A includes information of these encoded multiple video segments. As used herein, the playlist 206A can be a manifest file having metadata relating to the video and the in-memory video segments of the video. The playlist 206A may include, but is not limited to, bit rate at which the each video segment is played at the user device 210, a sequence or an order in which the each video segments to be played at user device 210, an encoding algorithm being used to encode the segments and such other information well known in the art. As used herein, the URL for the playlist 206A may be used by the user device 210 to refer/point and access the in-memory playlist 206A stored in the memory of the server 204. The user device 210 may use the URL to access an address of the memory of the server 204 where the in-memory playlist is stored.

On receiving the playlist URL from the distribution unit 206, the user device 210 may use the playlist URL for streaming the in-memory video segments of the video as requested. Further, the playlist URL provides access to the in-memory playlist 206A present at the distribution unit 206. The user device 210 reads the in-memory playlist 206A at the distribution unit 206 by accessing the playlist URL and accordingly, streams the in-memory video segments of the video based on the in-memory playlist 206A. It is noted that the playlist includes object URLs which references/points to the in-memory space on the user device (such as web browser application space) to stream each of the video segments in sequence. Although the server 204 and the distribution unit 206 in the invention have been shown and described as two different units/entities; however, it is well understood by any person skilled in the art that the server 204 and the distribution unit 206 can be considered as a single unit/entity which performs the functions/operations as described herein. Further, the terms server and distribution unit can be used interchangeably or in combination.

Table 1 below shows an exemplary in-memory playlist 206A created at the distribution unit 206 and stored at the server 204 which includes the video name, artist of the video, type of the video, video segment identifier, sequence/order in which the video segment is to be played, bitrate at which the each video segment is to be played a, duration of each video segment, object URL of each video segment and encoding being used for of each of the video segments.

TABLE 1

PLAYLIST.yyyy
Playlist URL: xxxxxxxxx
Video: Concert ABC
Artist/s: Artist 1, Artist 2, Artist 3, Artist 4
Type of Video: Live Video

| Video Segment Name | Sequence/ Order | Bitrate | Duration | Object URL | Encoding |
|---|---|---|---|---|---|
| Video Segment A | 1st | 1 megabits per second | 10 seconds | xyxyxyx.obj | mpg2_ts codec |
| Video Segment B | 3rd | 0.5 megabits per second | 8 seconds | xxxxxxx.obj | mpg2_ts codec |
| Video Segment C | 2nd | 2 megabits per second | 12 seconds | yyyyyyy.obj | mpg2_ts codec |
| Video Segment N | Nth | 1 megabits per second | 11 seconds | nmbgvc.obj | mpg2_ts codec |

Figure 3:
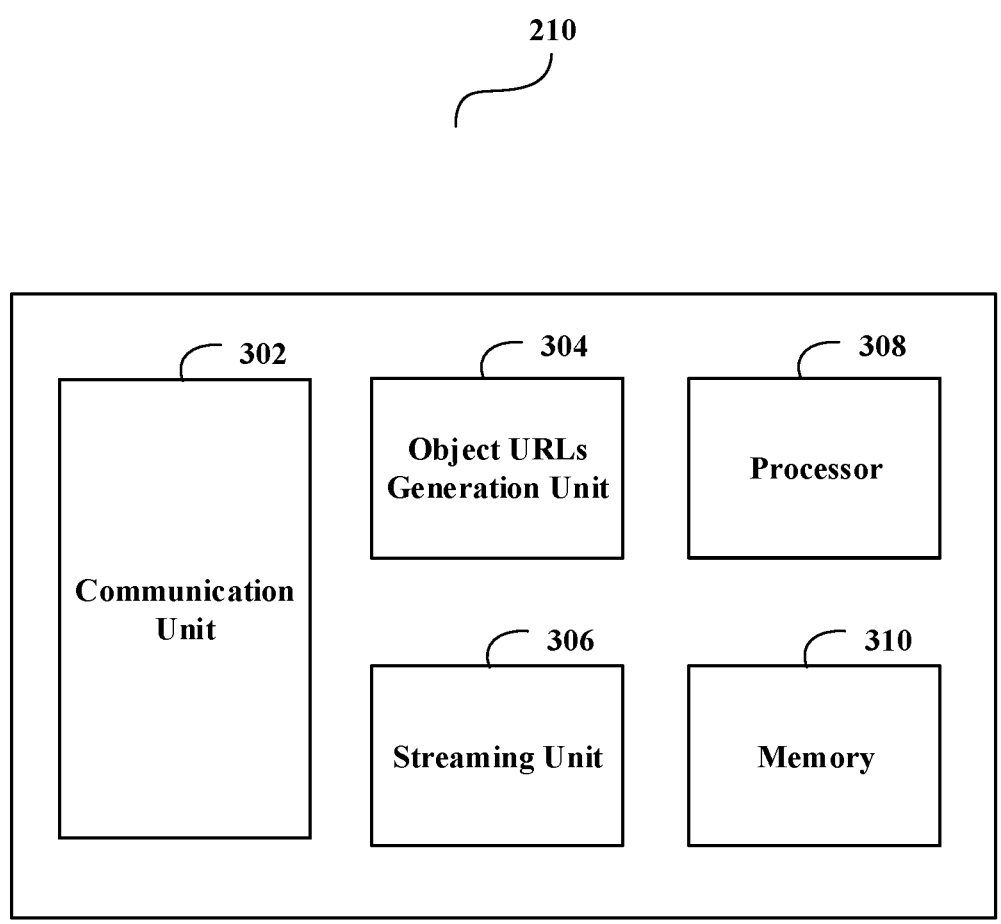
FIG. 3 depicts block diagram of different components in a user device according to an exemplary embodiment of the invention.

FIG. 3 depicts block diagram of different components in a user device 210 according to an exemplary embodiment of the invention. The user device 210 comprises a communication unit 302, an object uniform resource locators (URLs) generation unit 304, a streaming unit 306, a processor 308 and a memory 310 among other units. The communication unit 302 of the user device 210 is configured to transmit a request to the server 204 for streaming a video and also configured to receive one or more video segments of the video from the server 204, in response to the request. Once the user device 210 receives the one or more video segments of the video, the user device 210 may store and assemble the encoded multiple segments of video in the memory 310 of the user device 210. These encoded multiple segments of video may be called as in-memory video segments at user device 210. The memory 310 of the user device 210 may be a memory allocated to a web application process, wherein such process may be implemented in a web browser of the user device 210.

The object URLs generation unit 304 of the user device 210 is configured to create object uniform resource locators (URLs) 212 for each of the in-memory video segments. Each of the object URL at the user device 210 may have an extension of ".obj". When the object URLs generation unit 304 creates the object URLs 212 for each of the in-memory video segments, the object URLs generation unit 304 provides the created object URLs 212 to the communication unit 302. The communication unit 302 is configured to transmit the created object URLs 212 to the server 204. The server 204 receives the created object URLs 212 of the video segments and creates a in-memory playlist 206A (in the memory of the server 204) including each of the object URLs 212 of the in-memory video segments in the playlist 206A. As used herein, the memory used for storing the playlist can be the in-memory of the server and not the server disk. The server 204 also creates a URL for the in-memory playlist 206A having the object URLs 212 of the in-memory video segments. Then, the server 204 transmits the URL of the in-memory playlist 206A to the communication unit 302 of the user device 210. As used herein, the communication unit 302 may be a transceiver of the user device 210.

The communication unit 302 is configured to receive the playlist URL from the server 204. Further, the streaming unit 306 of the user device 210 is configured to stream the in-memory video segments of the video (stored at the user device 210) by using the playlist URL. The streaming unit 306 is also configured to read the in-memory playlist 206A at the server 204 by accessing the playlist URL and accordingly, streams the in-memory video segments of the video based on the in-memory playlist 206A. The streaming unit may be a web browser or an application stored in the memory 310 of the user device 210 which is used for streaming the video.

Figure 4:
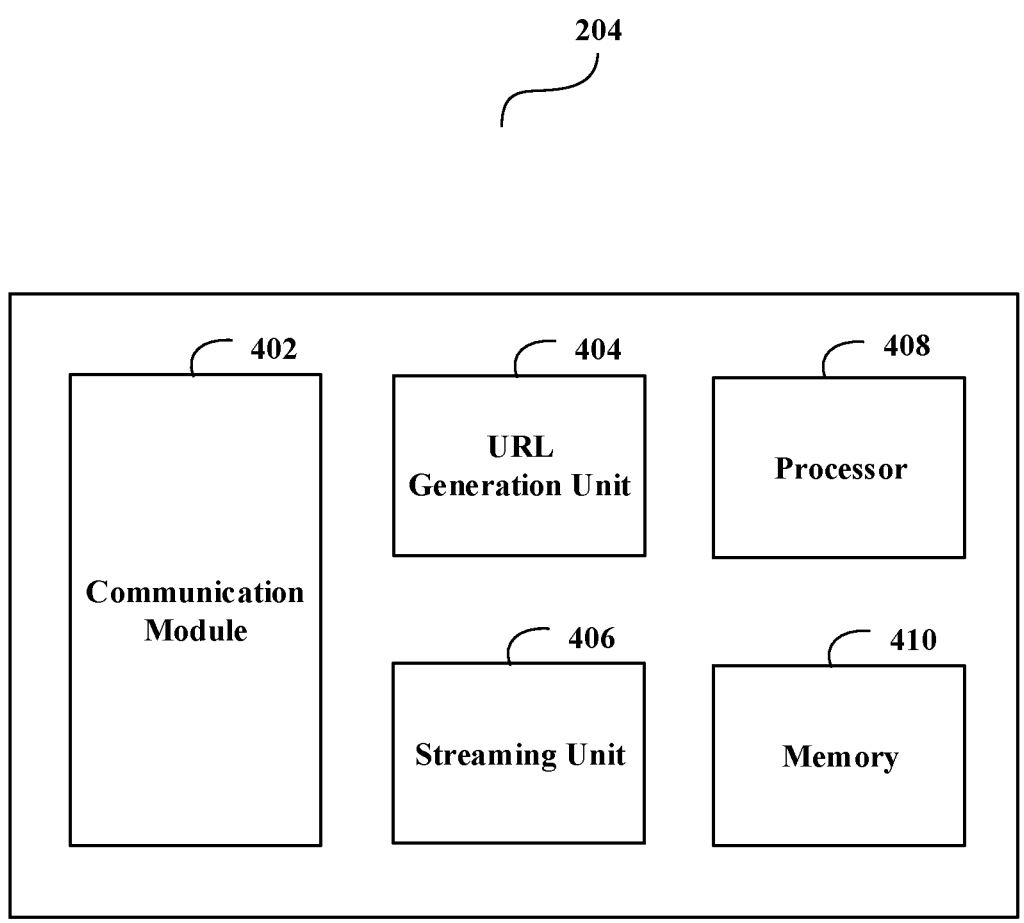
FIG. 4 depicts block diagram of different components in a server according to an exemplary embodiment of the invention.

FIG. 4 depicts block diagram of different components on a server 204 according to an exemplary embodiment of the invention. Along with the media encoding unit 204A and the segmentation and validation unit 204B as described in FIG. 2 above, the server 204 also comprises a communication module 402, a uniform resource locators (URLs) generation unit 404, a streaming unit 406, a processor 408 and a memory 410. The communication module 402 is configured to receive a request from the user device 210 for streaming the video. Upon receiving the request from the user device 210, the server 204 creates one or more video segments of the video in the memory 410 of the server 204. As video segments of the video are stored in the memory 410 of the server 204, these video segments may be called as in-memory video segments at the server 204. It is be noted here that the video segments are stored in the memory 410 of the server 204 and not stored on the disk of the server 204.

The server 204 is also configured to transmit the one or more in-memory video segments of the video to the user device 210, in response to the request. The communication module 402 of the server 204 is further configured to receive, from the user device 210, object uniform resource locators (URLs) 212 for each of the one or more in-memory video segments of the video.

Once the communication module 402 of the server 204 receives URLs 212 from the user device 210, the server 204 creates an in-memory playlist 206A. The URLs generation unit 404 is configured to create a playlist URL for the in-memory playlist 206A, the in-memory playlist 206A includes the object URLs of the one or more video segments. The communication module 402 provides the playlist URL for the in-memory playlist 206A to the communication unit 302 of the user device 210. When the user device 210 accesses the playlist URL for the in-memory playlist 206A through the communication unit 302, the streaming unit 406 is configured to provide the video to the user device 210 in the form of continuous video segments.

Figure 5:
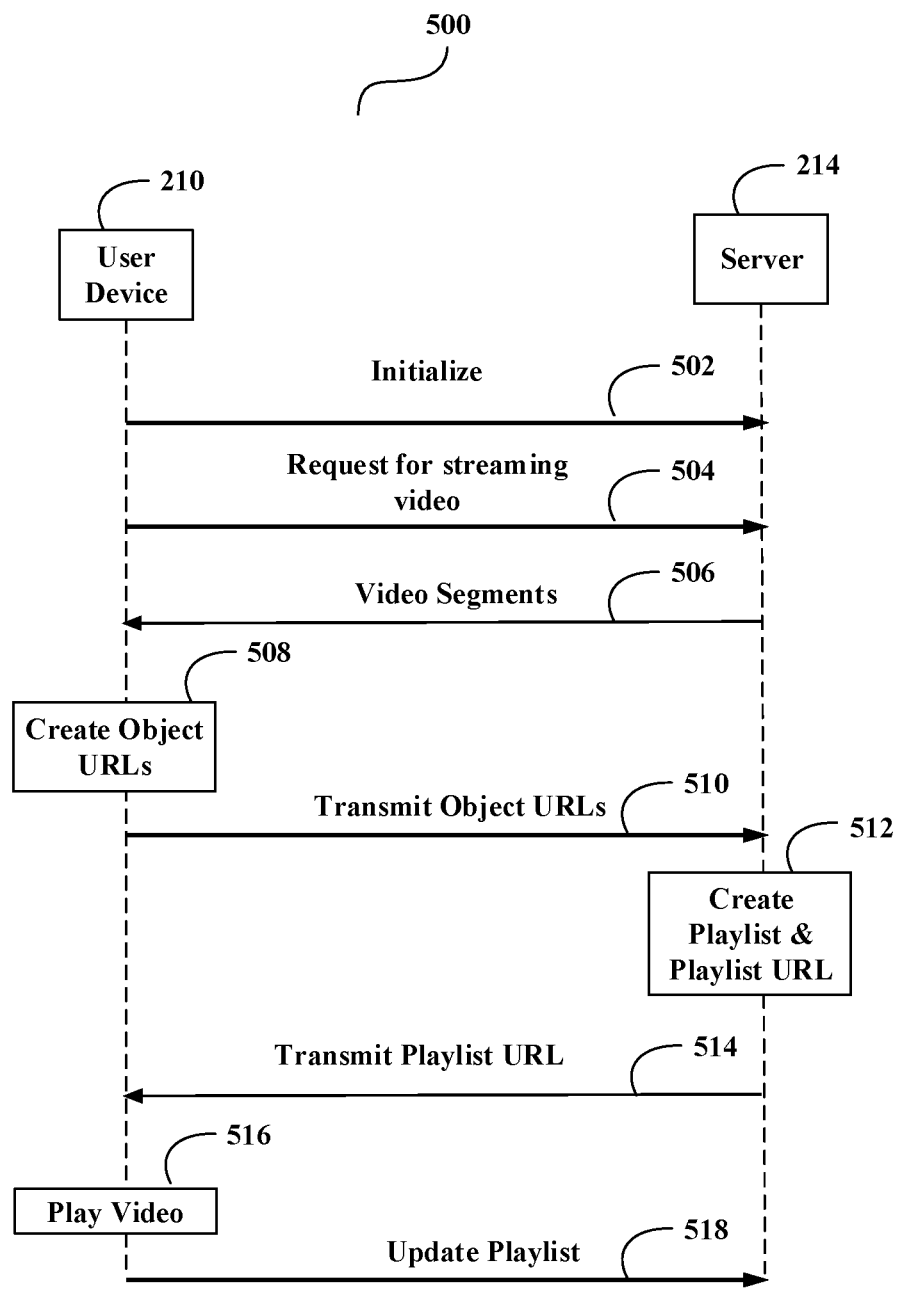
FIG. 5 depicts an exemplary signaling flow diagram according to an exemplary embodiment of the invention.

FIG. 5 depicts an exemplary signal flow diagram according to an exemplary embodiment of the invention.

At step 502, a communication between a server 204 and a user device 210 is established when the user device 210 initializes the communication. Such communication can be established by accessing a URL of a website in a web browser or a user application stored in the memory 310 and executed by the user device 210.

At step 504, when the communication between the server 204 and the user device 210 is established, the user device 210 transmits a request to the server 204 for streaming a video.

At step 506, when the server 204 receives the request for streaming the video from the user device 210, the server 204 transmits the one or more segments of video to the user device 210 through the network 208 and the user device 210 receives and stores the one or more segments of video in the memory 310 of the user device 210, and may be referred as in-memory video segments.

At step 508, the user device 210 creates the object URLs 212 for each of the in-memory video segments. Each of the object URL at the user device 210 may have an extension of ".obj".

At step 510, the user device 210 transmits the created object URLs 212 for each of the in-memory video segments to the server 204.

At step 512, the server 204 receives the created object URLs 212 of the in-memory video segments from the user device 210 and the server 204 creates an in-memory playlist 206A including each of the object URLs 212 of the in-memory video segments in the playlist 206A. Also, the server 204 creates a URL for the in-memory playlist 206A having the object URLs 212 of the in-memory video segments.

At step 514, the server 204 transmits the playlist URL for the in-memory playlist 206A to the user device 210.

At step 516, the user device 210 receives the playlist URL and uses the playlist URL for streaming the in-memory video segments of the video as requested. Further, the playlist URL provides access to the in-memory playlist 206A present at the server 204. The user device 210 reads the in-memory playlist 206A at the server 204 by accessing the playlist URL and accordingly, streams the in-memory video segments of the video based on the in-memory playlist 206A.

At step 518, the in-memory playlist 206A is updated periodically at the server 204 based on new in-memory video segments of the video received by the user device 210. As the user device 210 receives new video segments from the server 204, the user device 210 creates object URLs for the new video segments and transmits the object URLs for the new video segments to the server 204. The server 204 updates the playlist 206A by including the object URLs for the new video segments in the playlist 206A.

The present invention is applicable in various fields such as, but not limited to, online streaming content, HyperText Transfer Protocol (HTTP) streaming, HTTP live streaming, video calling, video recordings, and any such field that is well known in the art.

The present invention provides the following technical advantages over the existing methods and systems: a) elimination of disk fragmentation problem at the server end by sending playlist URL to the user device, where the playlist URL further provides object URLs to the in-memory video segments b) elimination of creating physical files for playlist and the video segments, c) minimizes storage requirement at the server, as the actual video segments are not stored in the form of disk files rather they are in-memory objects pointed by object URLs in the user device or a web browser of the user device, the playlist is also created as in-memory object at the server which is nothing but a playlist URL, and d) reduction in disk input/output as both playlist and video segments are not being stored on the disk as physical files, instead they are referred as in memory objects The embodiments of the invention discussed herein are exemplary and various modification and alterations to a known person skilled in the art are within the scope of the invention.

In one embodiment of the invention, the invention can be operated using the one or more computer readable devices comprising a computer readable medium. The one or more computer readable devices can be associated with the item 100. The computer readable medium of the computer readable devices is configured to transmit a request to a server 204 by a user device 210 for streaming a video and receive one or more video segments of the video from the server 204, the one or more video segments are stored in memory of the user device. Further, object uniform resource locators (URLs) 212 for each of the one or more video segments is created and transmitted to the server 204. The server 204 creates an in-memory playlist 206A including the object URLs of the one or more video segments. The user device 204 receives a playlist URL of the in-memory playlist 206A from the server 204 and streams the one or more video segments of the video at the user device 210 by using the playlist URL.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A method for streaming a video, the method comprising:
    transmitting a request to a server by a user device for streaming the video;
    wherein the server is operable to, responsive to the request, call one or more video segments of the video as in-memory video segments stored in a memory of the server and not at a disk of the server;
    receiving, from the server, the one or more video segments of the video, the one or more video segments are stored in memory of the user device;
    creating object uniform resource locators (URLs) for each of the one or more video segments;
    transmitting the created object URLs to the server, wherein an in-memory playlist is created on the server including the object URLs of the one or more video segments, wherein the in-memory playlist is stored in the memory of the server and not at the disk of the server;
    receiving a playlist URL of the in-memory playlist from the server; and
    streaming the one or more video segments of the video to the user device by using the playlist URL to access the in-memory playlist stored in the memory of the server and not at the disk of the server.

2. The method of claim 1, wherein the server is coupled to a distribution unit for creating the playlist and the playlist URL.

3. The method of claim 1, wherein the object URLs for the one or more video segments in the playlist point to memory of the user device for streaming the one or more video segments.

4. The method of claim 1, wherein the memory on the user device for storing the one or more video segments is a memory space allocated to a web application process implemented in a web browser application of the user device.

5. The method of claim 4, wherein the one or more video segments are streamed in the web browser application and each of the one or more video segments has a specified duration.

6. The method of claim 1, wherein the video is fetched from a content provider based on the request from the user device.

7. The method of claim 1, wherein the video is a HyperText Transfer Protocol (HTTP)-based live streaming (HLS) video.

8. The method of claim 1, wherein the in-memory playlist is updated based on new video segments received by the user device.

9. The method of claim 1, wherein the in-memory playlist includes one or more bit rates at which the each video segment is played at the user device and/or a sequence in which the each video segments to be played at the user device.

10. A user device for streaming a video, the user device operable to perform user device operations comprising:
    transmitting a request to a server for streaming the video;
    wherein the server is operable to, responsive to the request, call one or more video segments of the video as in-memory video segments stored in a memory of the server and not at a disk of the server;
    receiving the one or more video segments of the video from the server, the one or more video segments are stored in memory of the user device;
    creating object uniform resource locators (URLs) for each of the one or more video segments;
    transmitting the created object URLs to the server, wherein an in-memory playlist is created on the server including the object URLs of the one or more video segments, wherein the in-memory playlist is stored in the memory of the server and not at the disk of the server;
    receiving a playlist URL of the in-memory playlist from the server; and
    streaming the one or more video segments of the video by using the playlist URL to access the in-memory playlist stored in the memory of the server and not at the disk of the server.

11. The user device of claim 10, wherein the object URLs for the one or more video segments in the playlist point to the memory of the user device for streaming the one or more video segments.

12. The user device of claim 10, wherein the memory on the user device for storing the one or more video segments is a memory space allocated to a web application process implemented in a web browser application of the user device.

13. The user device of claim 12, wherein the one or more video segments are streamed in the web browser application and each of the one or more video segments has a specified duration.

14. The user device of claim 10, wherein the in-memory playlist is updated based on new video segments received by the user device.

15. The user device of claim 10, wherein the in-memory playlist includes one or more bit rates at which the each video segment is played at the user device and/or a sequence in which the each video segments to be played at user device.

16. A server for providing video to a user device, the server operable to perform server operations comprising:
    receiving a request from the user device for streaming the video;
    creating one or more video segments of the video in a memory of the server and not at a disk of the server;
    transmitting the one or more video segments of the video to the user device; and receiving, from the user device, object uniform resource locators (URLs) for each of the one or more video segments of the video;

creating a playlist URL for an in-memory playlist created by the server, the in-memory playlist including the object URLs of the one or more video segments, wherein the in-memory playlist is stored in the memory of the server and not at the disk of the server;

transmitting the playlist URL of the in-memory playlist to the user device; and providing the video to the user device in an event the playlist URL is executed by the user device.

17. The server of claim 16, wherein the server operations further comprise creating the playlist and the playlist URL.

18. The server of claim 16, wherein the one or more video segments are in-memory video segments stored by the user device.

19. The server of claim 16, wherein the object URLs for the one or more video segments in the playlist point to the memory of the user device for streaming the one or more video segments.

* * * * *